United States Patent
Zheng et al.

(10) Patent No.: US 9,628,788 B2
(45) Date of Patent: Apr. 18, 2017

(54) METHODS AND APPARATUS FOR IMPLICIT ADAPTIVE MOTION VECTOR PREDICTOR SELECTION FOR VIDEO ENCODING AND DECODING

(75) Inventors: Yunfei Zheng, San Diego, CA (US); Peng Yin, Ithaca, NY (US); Jole Sole, La Jolla, CA (US); Xiaoan Lu, Princeton, NJ (US); Qian Xu, Folsom, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 881 days.

(21) Appl. No.: 13/634,663

(22) PCT Filed: Mar. 3, 2011

(86) PCT No.: PCT/US2011/000421
§ 371 (c)(1),
(2), (4) Date: Dec. 18, 2012

(87) PCT Pub. No.: WO2011/115659
PCT Pub. Date: Sep. 22, 2011

(65) Prior Publication Data
US 2013/0208787 A1    Aug. 15, 2013

(51) Int. Cl.
*H04N 19/00* (2014.01)
*H04N 19/56* (2014.01)
(Continued)

(52) U.S. Cl.
CPC ..... *H04N 19/00036* (2013.01); *H04N 19/109* (2014.11); *H04N 19/46* (2014.11);
(Continued)

(58) Field of Classification Search
CPC ........... H04N 19/00036; H04N 19/109; H04N 19/46; H04N 19/513; H04N 19/52;
(Continued)

(56) References Cited

U.S. PATENT DOCUMENTS

| 5,546,130 A | * 8/1996 | Hackett et al. | 348/447 |
| 2001/0026590 A1 | * 10/2001 | Kang | H04N 5/145 375/240.16 |

(Continued)

FOREIGN PATENT DOCUMENTS

| CN | 101326650 A | 12/2008 |
| JP | 201016453 A | 1/2010 |

(Continued)

OTHER PUBLICATIONS

Dai et al., "An Efficient Motion Vector Coding Algorithm Based on Adaptive Motion Vector Prediction," 90, MPEG Meeting, Oct. 2009, 4 pages, Oct. 23, 2009.

(Continued)

*Primary Examiner* — Peter D Le
(74) *Attorney, Agent, or Firm* — Brian J. Dorini; Ronald J. Kolczynski (57) ABSTRACT

Methods and apparatus are provided for implicit adaptive motion vector predictor selection for video encoding and decoding. The method encodes an image block using implicit adaptive motion vector predictor selection. The motion vector for encoding the block is predicted by defining a set of motion vector predictor candidates for the block based on a plurality of spatio-temporal neighboring motion vectors; and then selecting from the set a particular motion vector predictor candidate as the motion vector for encoding the bloc. The selection is made responsive to respective values for a fidelity of the spatio-temporal neighboring motion vectors.

9 Claims, 8 Drawing Sheets

(51) Int. Cl.
  *H04N 19/109* (2014.01)
  *H04N 19/52* (2014.01)
  *H04N 19/70* (2014.01)
  *H04N 19/46* (2014.01)
  *H04N 19/513* (2014.01)
  *H04N 19/61* (2014.01)
  *H04N 19/567* (2014.01)

(52) U.S. Cl.
  CPC ........... *H04N 19/513* (2014.11); *H04N 19/52* (2014.11); *H04N 19/521* (2014.11); *H04N 19/56* (2014.11); *H04N 19/567* (2014.11); *H04N 19/61* (2014.11); *H04N 19/70* (2014.11)

(58) Field of Classification Search
  CPC .... H04N 19/521; H04N 19/56; H04N 19/567; H04N 19/61; H04N 19/70
  See application file for complete search history.

(56) References Cited

U.S. PATENT DOCUMENTS

| | | | | |
|---|---|---|---|---|
| 2003/0072374 | A1* | 4/2003 | Sohm | 375/240.16 |
| 2003/0123738 | A1* | 7/2003 | Frojdh et al. | 382/236 |
| 2004/0252764 | A1 | 12/2004 | Hur et al. | |
| 2006/0012719 | A1* | 1/2006 | Karczewicz et al. | 348/699 |
| 2006/0093038 | A1* | 5/2006 | Boyce | 375/240.16 |
| 2007/0131269 | A1 | 6/2007 | Dutta | |
| 2008/0247465 | A1 | 10/2008 | Xin et al. | |
| 2011/0103486 | A1 | 5/2011 | Sato et al. | |
| 2011/0176615 | A1* | 7/2011 | Lee et al. | 375/240.16 |

FOREIGN PATENT DOCUMENTS

| | | |
|---|---|---|
| WO | WO2008082158 A1 | 7/2008 |
| WO | WO2009115901 | 9/2009 |

OTHER PUBLICATIONS

Jeon et al., "An Adaptive Reference Frame Selection Method for Multiple Reference Frame Motion Estimation in the H.264/AVC," 16th IEEE International Conference on Image Processing, 2009 (ICIP '09), pp. 629-632.

Dai et al., "Motion Vector Coding based on Predictor Selection and Boundary-matching Estimation," IEEE International Workshop on Multimedia Signal Processing. 2009 (MMSP '09), pp. 1-5, Oct. 5-7, 2009.

Won et al., "Motion Vector Coding using Decoder-side Estimation of Motion Vector," IEEE International Symposium on Broadband Multimedia Systems and Broadcasting, 2009 (BMSB '09), pp. 1-4, May 13-15, 2009.

Nisar et al.. "A Correlation Based Content Aware Search Strategy for Fast Motion Estimation for H.264/AVC," International Conference on Consumer Electronics, 2009 (ICCE '09), Digest of Technical Papers, pp. 1-2. Jan. 10-14, 2009.

Laroche et al., "RD Optimized Coding for Motion Vector Predictor Selection," IEEE Transactions on Circuits and Systems for Video Technology, vol. 18, No. 9, Sep. 2008, pp. 1247-1257.

Nisar et al., "An adaptive block motion estimation algorithm based on spatio-temporal correlation," International Conference on Consumer Electronics, 2006 (ICCE '06), Digest of Technical Papers, pp. 393-394.

Wiegand et al., "Overview of the H.264/AVC Video Coding Standard," IEEE Transactions on Circuits and Systems for Video Technology, pp. 1-19, Jul. 2003.

\* cited by examiner

METHODS AND APPARATUS FOR IMPLICIT ADAPTIVE MOTION VECTOR PREDICTOR SELECTION FOR VIDEO ENCODING AND DECODING

CROSS-REFERENCE TO RELATED APPLICATIONS

This application claims the benefit, under 35 U.S.C. §365 of International Application PCT/US11/000421, filed Mar. 3, 2011, which was published in accordance with PCT Article 21(2) on Mar. 3, 2011 in English and which claims the benefit of U.S. provisional patent application No. 61/314,506, filed Mar. 16, 2010.

TECHNICAL FIELD

The present principles relate generally to video encoding and decoding and, more particularly, to methods and apparatus for implicit adaptive motion vector predictor selection for video encoding and decoding.

BACKGROUND

Motion estimation and compensation are widely used in video compression to leverage and make use of the temporal redundancy inherent between images of a video sequence. Motion information is usually represented by a displacement format with a motion vector and corresponding reference frame index to indicate the correspondence of a current coding block in the reference frame buffer. Such motion information is transmitted or otherwise conveyed to a decoder as overhead. Obviously, the goal in compression is to convey information for as little cost as possible, while still maintaining a desired objective and subjective quality of images.

In the state of the art video coding standard, namely the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a motion vector is predicted by the median of its spatial causal neighboring motion vectors. This approach is very simple and effective when the motion field is relatively smooth and the neighboring motion vectors have high fidelities. However, when the motion field tends to be complicated, this approach may not work well by only selecting the median value of the neighboring motion vectors. Furthermore, there could be many low fidelity motion vectors surrounding a current coding block. These factors may cause a degradation of the quality of a motion vector predictor.

A technique known as motion vector competition (MV-Comp) is described in a first prior art approach. In MVComp, the procedure for motion vector predictor selection is incorporated within the rate-distortion optimization of a coding block. As a resulting output, MVComp explicitly transmits (or otherwise conveys, e.g., embedded on a media) the best motion vector predictor index to the decoder. In MVComp, a coding block has a set of motion vector predictors. The best motion vector predictor will be selected based on the rate-distortion (RD) optimization. The index of the motion vector predictor in the set will be explicitly transmitted to the decoder if the set has more than one candidate. The process is highly optimized because each of the motion vector predictors will be checked and compared with other motion vector predictors. The set can include motion vectors which come from both spatial and temporal causal neighboring blocks. Given a motion vector predictor set, this approach can also find the best predictor in the set in the rate-distortion sense. However, the complexity is very high at the encoder as it will take each predictor into the mode decision loop for each coding block. Another shortcoming is the overhead (e.g., the index of the motion vector predictor in the set) and can make this approach costly and inefficient especially for the low bitrate applications.

SUMMARY

These and other drawbacks and disadvantages of the prior art are addressed by the present principles, which are directed to methods and apparatus for implicit adaptive motion vector predictor selection for video encoding and decoding.

According to an aspect of the present principles, there is provided an apparatus. The apparatus includes a video encoder for encoding at least a block in a picture using implicit adaptive motion vector predictor selection. A motion vector for encoding the block is predicted by defining a set of motion vector predictor candidates for the block based on a plurality of spatio-temporal neighboring motion vectors, and selecting from the set a particular motion vector predictor candidate as the motion vector for encoding the block responsive to respective values for a fidelity of the spatio-temporal neighboring motion vectors.

According to another aspect of the present principles, there is provided a method in a video encoder. The method includes encoding at least a block in a picture using implicit adaptive motion vector predictor selection. A motion vector for encoding the block is predicted by defining a set of motion vector predictor candidates for the block based on a plurality of spatio-temporal neighboring motion vectors, and selecting from the set a particular motion vector predictor candidate as the motion vector for encoding the block responsive to respective values for a fidelity of the spatio-temporal neighboring motion vectors.

According to yet another aspect of the present principles, there is provided an apparatus. The apparatus includes a video decoder for decoding at least a block in a picture using implicit adaptive motion vector predictor selection. A motion vector for decoding the block is predicted by defining a set of motion vector predictor candidates for the block based on a plurality of spatio-temporal neighboring motion vectors, and selecting from the set a particular motion vector predictor candidate as the motion vector for decoding the block responsive to respective values for a fidelity of the spatio-temporal neighboring motion vectors.

According to still another aspect of the present principles, there is provided a method in a video decoder. The method includes decoding at least a block in a picture using implicit adaptive motion vector predictor selection. A motion vector for decoding the block is predicted by defining a set of motion vector predictor candidates for the block based on a plurality of spatio-temporal neighboring motion vectors, and selecting from the set a particular motion vector predictor candidate as the motion vector for decoding the block responsive to respective values for a fidelity of the spatio-temporal neighboring motion vectors.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for implicit adaptive motion vector predictor selection for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, for purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Also, as used herein, the words "picture" and "image" are used interchangeably and refer to a still image or a picture from a video sequence. As is known, a picture may be a frame or a field.

Figure 1:
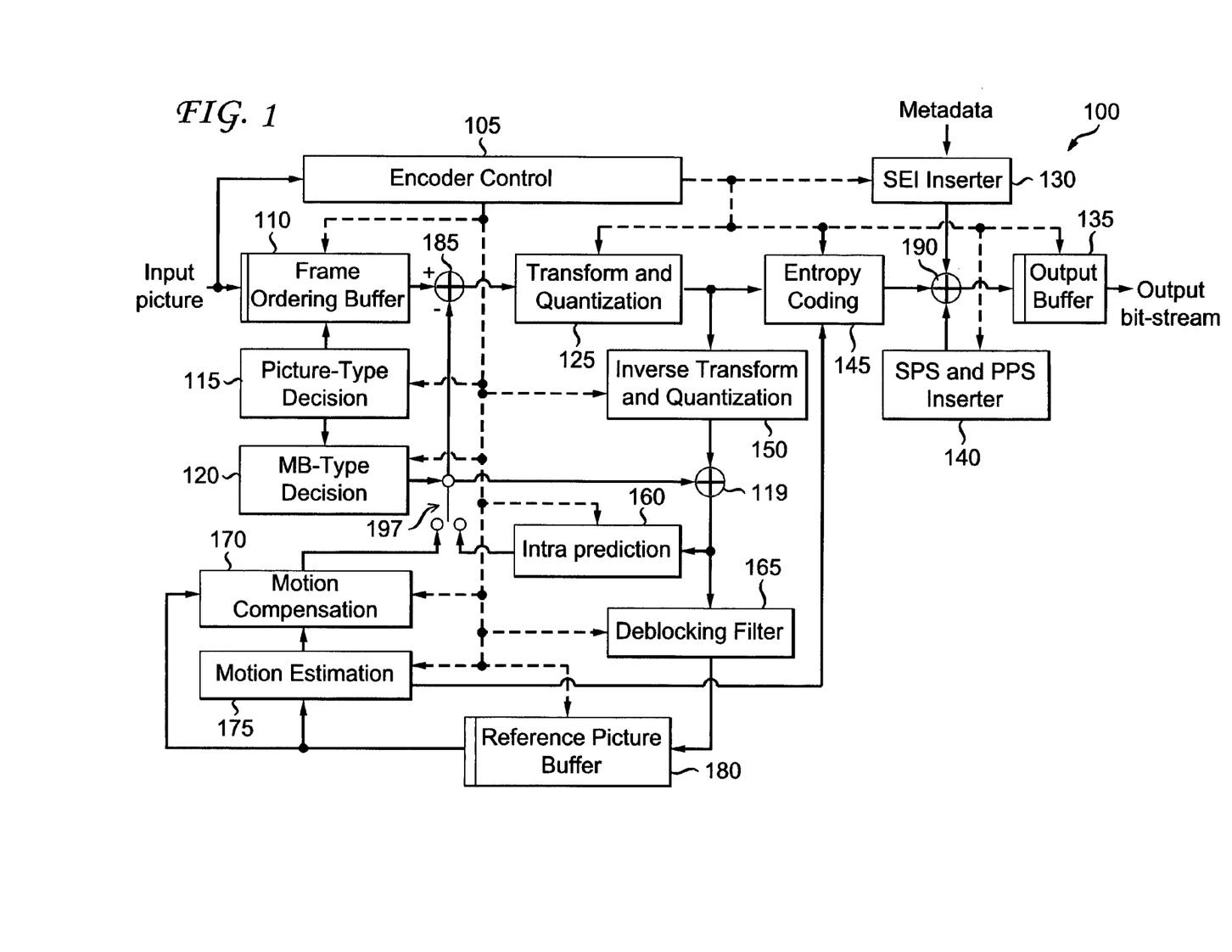
FIG. 1 is a block diagram showing an exemplary video encoder to which the present principles may be applied, in accordance with an embodiment of the present principles.

Turning to FIG. 1, an exemplary video encoder to which the present principles may be applied is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
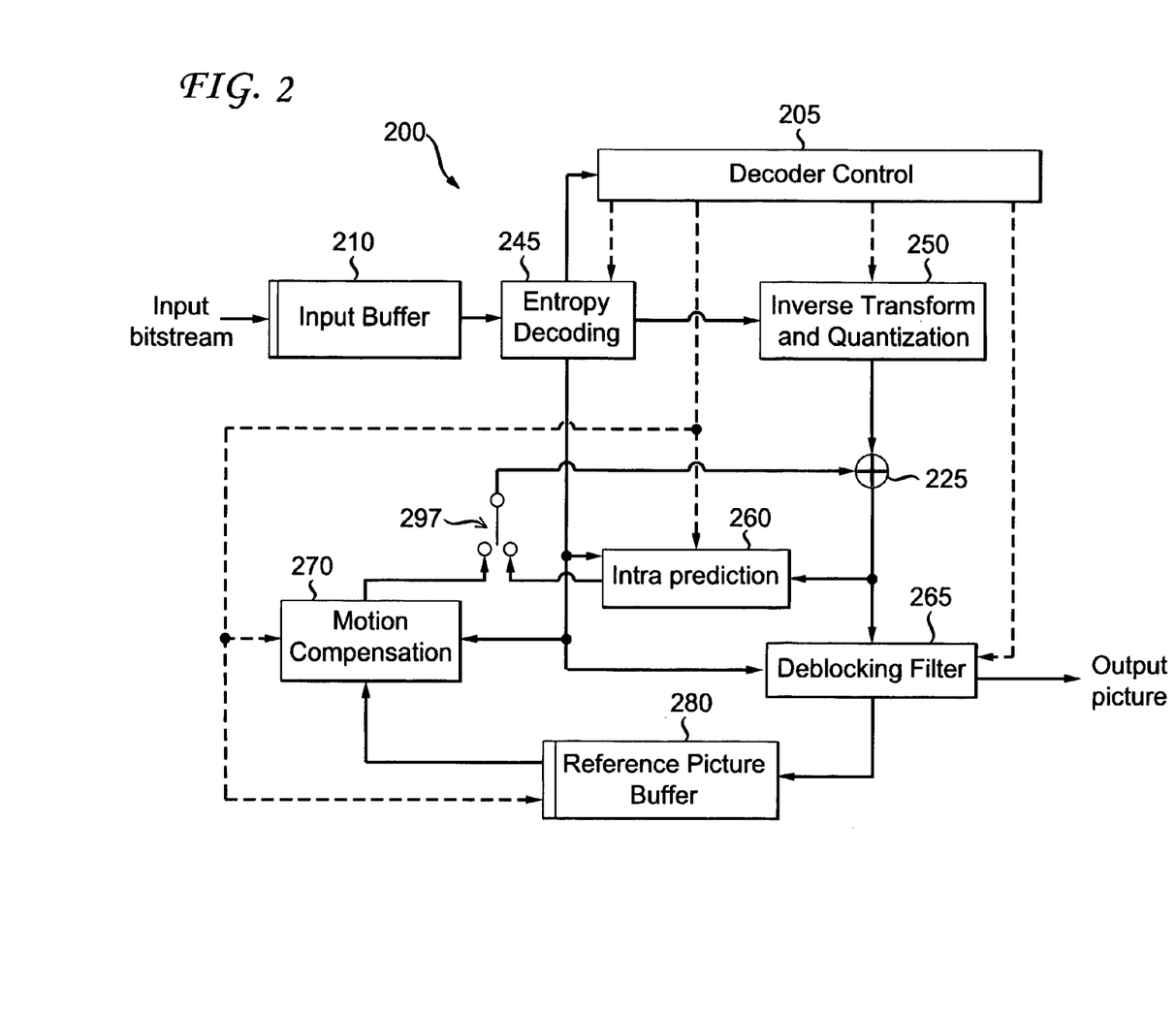
FIG. 2 is a block diagram showing an exemplary video decoder to which the present principles may be applied, in accordance with an embodiment of the present principles.

Turning to FIG. 2, an exemplary video decoder to which the present principles may be applied is indicated generally by the reference numeral 200. The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for implicit adaptive motion vector predictor selection for video encoding and decoding. In accordance with an embodiment of the present principles, a motion vector is predicted by one of its spatio-temporal neighboring motion vector. The selection is based on the motion compensation error of the corresponding motion vector candidate, which is available at both the encoder and decoder. Therefore, the selection is based on implicit (derived) data already available at the encoder and decoder without the need for side or additional information being sent from the encoder to the decoder. Therefore, using the present principles, there is no additional cost or overhead for motion vector predictor selection and, yet, the present principles still achieve very accurate prediction performance. A motion vector is derived at the decoder by exploiting the correlation among its spatio-temporal neighboring motion vectors and their prediction confidence. The prediction confidence can be a function of an estimated motion compensation error, motion vector magnitude, reference index, or other parameter available and related to motion information.

In accordance with the present principles, we exploit the correlation among neighboring motion vectors by defining a causal local neighborhood for each coding block. The neighborhood includes causal spatio-temporal neighboring blocks that are coded as inter-coded blocks. Since these blocks are already decoded, the motion vectors are known at both the encoder and decoder. These motion vectors form the motion vector candidate set. The next question is how to select motion vector predictors for the coding block within the candidate set.

In accordance with the present principles, we consider the fidelity of each candidate in the set. The fidelity is defined as the motion compensation error caused by using the motion vector to compensate the corresponding block. For example, considering a block $B_i$ in the neighborhood, block $B_i$ has motion vector $MV_i$ available at both the encoder and decoder. The motion compensation error $E_i$ of $B_i$ caused by using $MV_i$ can be estimated by the residual information of $B_i$. Thus, the fidelity of $MV_i$ can be defined as a function of $E_i$ as follows:

$$F(i)=f(E_i)$$

The function should be a decreasing function of $E_i$, which means that a large motion compensation error results in a low fidelity. Each motion vector in the candidate set has a fidelity value, which implicitly provides side information for our motion vector predictor selection.

After obtaining the fidelity values of the candidates, the selection process is made. The actual parameter or parameters used to make the selection can be from a variety of parameters. For example, in an embodiment, we can select the motion vector in the set which has the highest fidelity as the motion vector predictor. In another embodiment, we can use the weighted median value of the motion vectors in the set as the motion vector predictor. In an embodiment, the weights can be a function of the fidelity value. In an embodiment, we can also use weighted averaging or other functions that take into account the fidelity information in order to derive the motion vector predictor. Embodiments are presented which illustrate these varieties.

Since all information used in the selection and the calculation of the fidelity value is available at both the encoder and decoder, no overhead needs to be sent, which makes the present principles promising in both low and high bit rate applications. Compared to the median approach in the MPEG-4 AVC Standard, the present principles take into account the fidelity of the neighboring motion vectors, which may be suitable for the relatively complicated motion field cases with only a very minor increase in complexity.

Embodiment 1:

In Embodiment 1, the motion vector predictor selection is based on the prior information provided by the fidelity values of the neighboring candidates. The motion vector predictor of the current coding block is the motion vector in the set which has the highest fidelity.

Figure 3:
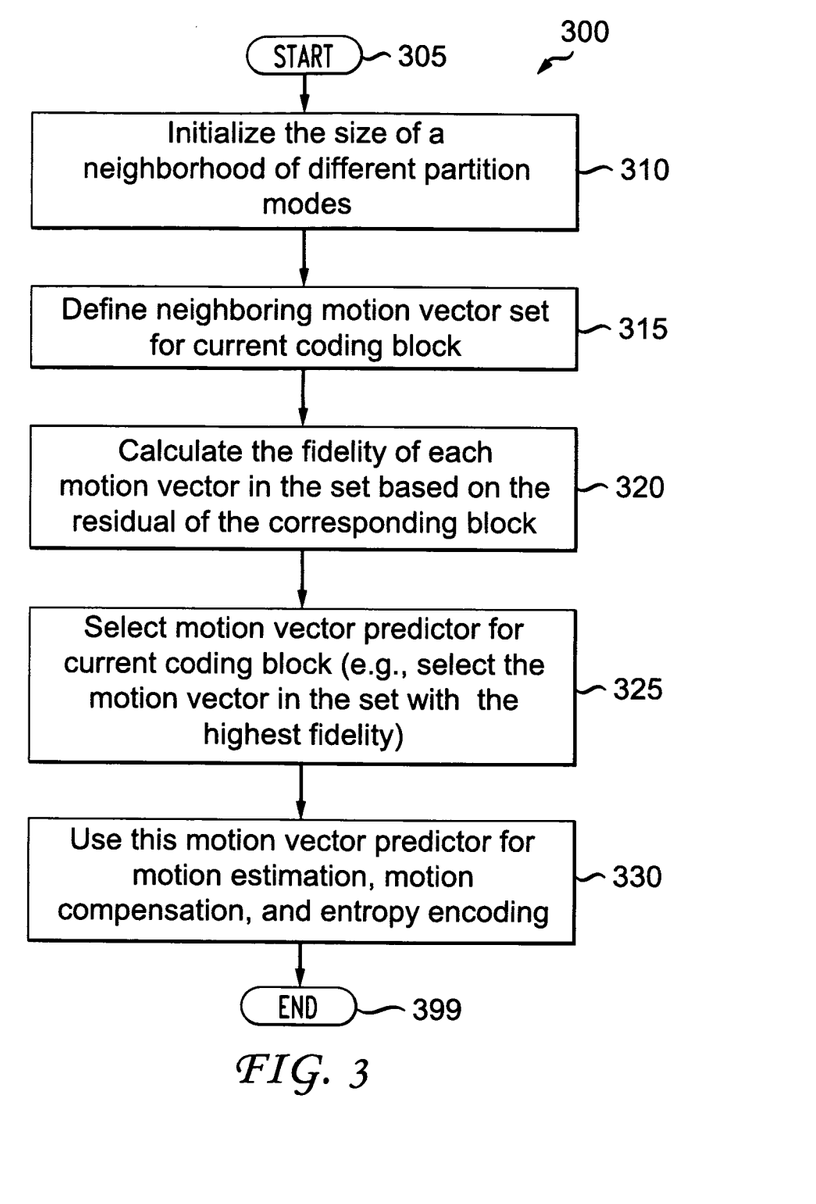
FIG. 3 is a flow diagram showing an exemplary method for implicit adaptive motion vector prediction selection in a video encoder, in accordance with an embodiment of the present principles.

Turning to FIG. 3, an exemplary method for implicit adaptive motion vector prediction selection in a video encoder is indicated generally by the reference numeral 300. The method 300 includes a start block 305 that passes control to a function block 310. The function block 310 initializes the size of a neighborhood of different partition modes, and passes control to a function block 315. The function block 315 defines the neighboring motion vector set for the current coding block, and passes control to a function block 320. The function block 320 calculates the fidelity of each motion vector in the set based on the residual of the corresponding block, and passes control to a function block 325. The function block 325 selects the motion vector predictor for the current coding block (e.g., selecting the motion vector in the set with the highest fidelity), and passes control to a function block 330. The function block 330 uses this motion vector predictor for motion estimation, motion compensation, and entropy encoding, and passes control to an end block 399.

Figure 4:
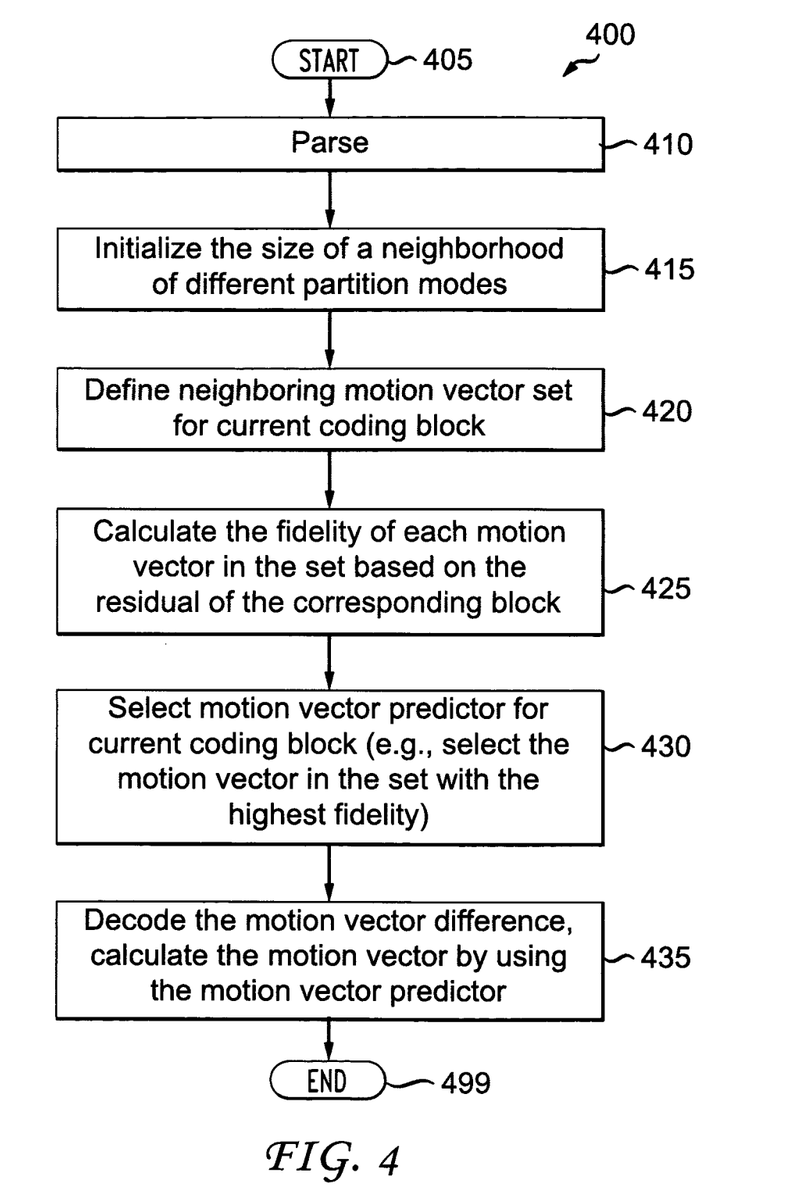
FIG. 4 is a flow diagram showing an exemplary method for implicit adaptive motion vector prediction selection in a video decoder, in accordance with an embodiment of the present principles.

Turning to FIG. 4, an exemplary method for implicit adaptive motion vector prediction selection in a video decoder is indicated generally by the reference numeral 400. The method 400 includes a start block 405 that passes control to a function block 410. The function block 410 parses an input bitstream, and passes control to a function block 415. The function block 415 initializes the size of a neighborhood of different partition modes, and passes control to a function block 420. The function block 420 defines the neighboring motion vector set for the current coding block, and passes control to a function block 425. The function block 425 calculates the fidelity of each motion vector in the set based on the residual of the corresponding block, and passes control to a function block 430. The function block 430 selects the motion vector predictor for the current coding block (e.g., selecting the motion vector in the set with the highest fidelity), and passes control to a function block 435. The function block 435 decodes the motion vector difference, calculates the motion vector by using the motion vector predictor, and passes control to an end block 499.

Embodiment 2:

In Embodiment 2, the fidelity values of the motion vector candidates are used for a weighted median filter to derive the motion vector predictor. The weights in the weighted median filter indicate the number of repetitions of a value within the filter support. The filter support here is the neighborhood that includes all the motion vector candidates of a block. If the weight of a motion vector is n, then the motion vector will be duplicated n times when being filtered by a median filter. In Embodiment 2, the weights are linked with the fidelity by a mapping function, which maps the fidelity to the number of repetitions of a motion vector. Then the output of the weighted median filter is taken as the motion vector predictor of the current coding block.

Figure 5:
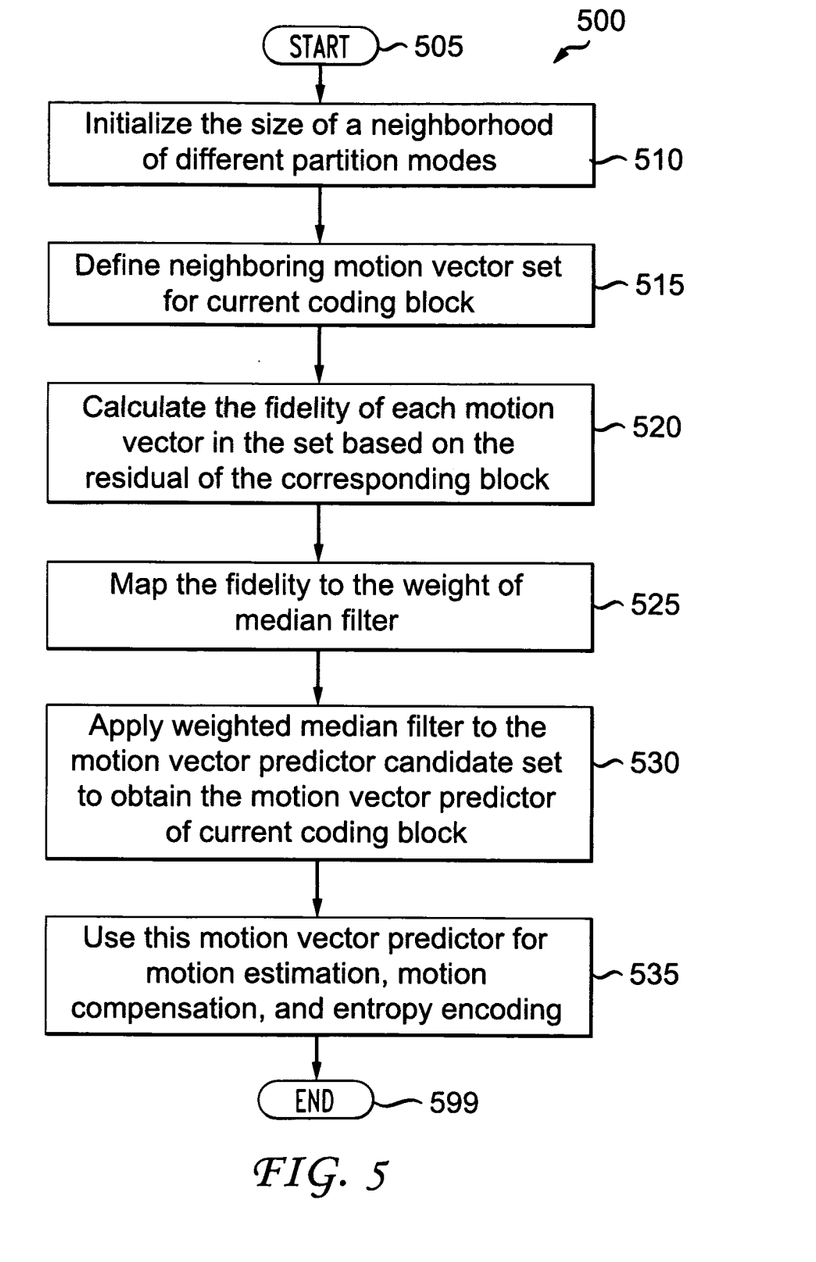
FIG. 5 is a flow diagram showing another exemplary method for implicit adaptive motion vector predictor selection in a video encoder, in accordance with an embodiment of the present principles.

Turning to FIG. 5, another exemplary method for implicit adaptive motion vector predictor selection in a video encoder is indicated generally by the reference numeral 500. The method 500 includes a start block 505 that passes control to a function block 510. The function block 510 initializes the size of a neighborhood of different partition modes, and passes control to a function block 515. The function block 515 defines the neighboring motion vector set for the current coding block, and passes control to a function block 520. The function block 520 calculates the fidelity of each motion vector in the set based on the residual of the corresponding block, and passes control to a function block 525. The function block 525 maps the fidelity to the weight of the median filter, and passes control to a function block 530. The function block 530 applies the weighted median filter to the motion vector predictor candidate set to obtain the motion vector predictor of the current coding block, and passes control to a function block 535. The function block 535 uses the motion vector predictor for motion estimation, motion compensation, and entropy encoding, and passes control to an end block 599.

Figure 6:
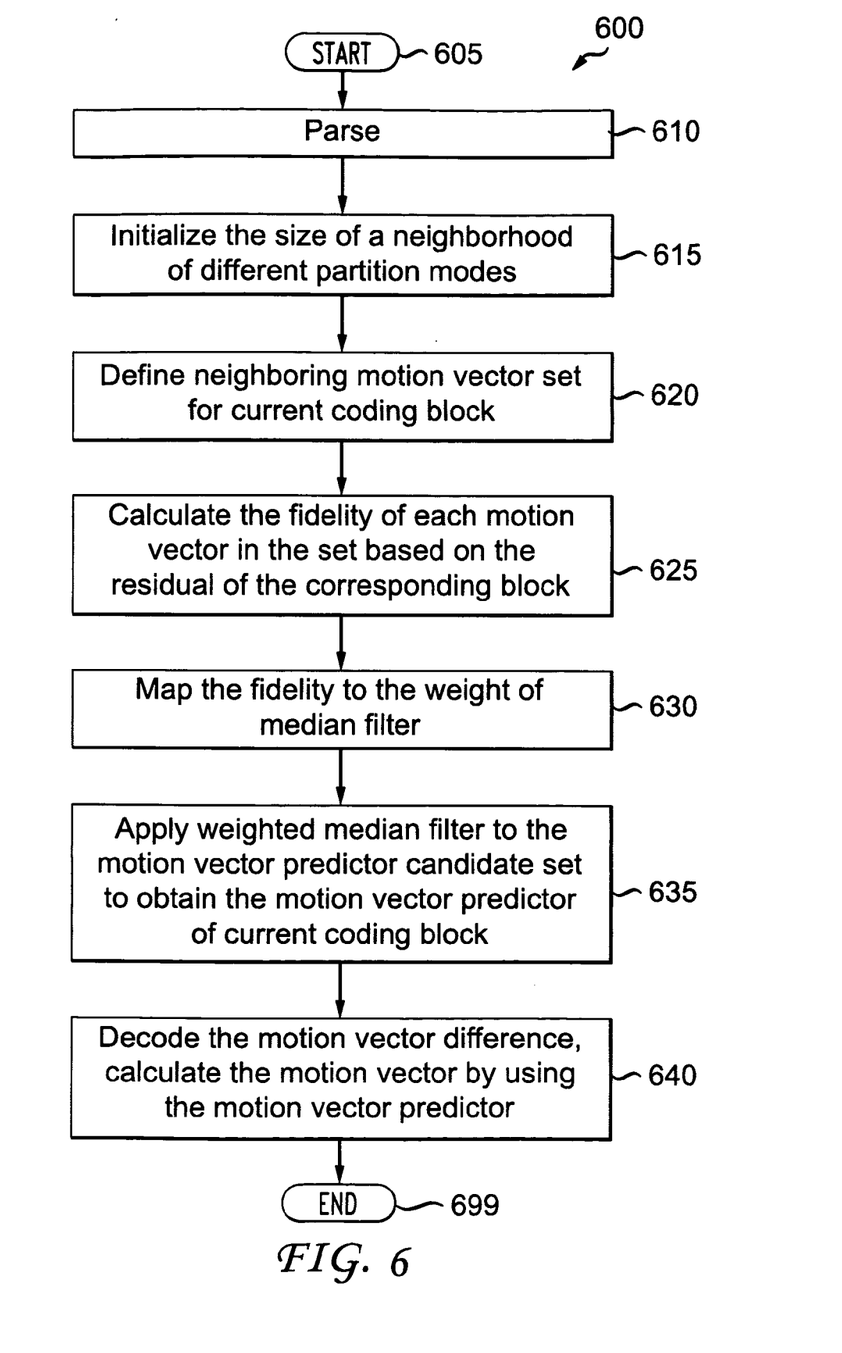
FIG. 6 is a flow diagram showing another exemplary method for implicit adaptive motion vector predictor selection in a video decoder, in accordance with an embodiment of the present principles.

Turning to FIG. 6, another exemplary method for implicit adaptive motion vector predictor selection in a video decoder is indicated generally by the reference numeral 600. The method 600 includes a start block 605 that passes control to a function block 610. The function block 610 parses an input bitstream, and passes control to a function block 615. The function block 615 initializes the size of a neighborhood of different partition modes, and passes control to a function block 620. The function block 620 defines the neighboring motion vector set for the current coding block, and passes control to a function block 625. The function block 625 calculates the fidelity of each motion vector in the set based on the residual of the corresponding block, and passes control to a function block 630. The function block 630 maps the fidelity to the weight of the median filter, and passes control to a function block 635. The function block 635 applies the weighted median filter to the motion vector predictor candidate set to obtain the motion vector predictor of the current coding block, and passes control to a function block 640. The function block 640 decodes the motion vector difference, calculates the motion vector by using the motion vector predictor, and passes control to an end block 699.

Embodiment 3:

In Embodiment 3, the implicit motion vector predictor selection can be combined with the explicit approach. The fidelities of neighboring motion vectors are generated and compared with a pre-defined threshold. If all fidelities are lower than the threshold, the explicit signaling approach is used for selecting the motion vector predictors based on the rate distortion optimization. Otherwise, the implicit signaling approach is used.

Figure 7:
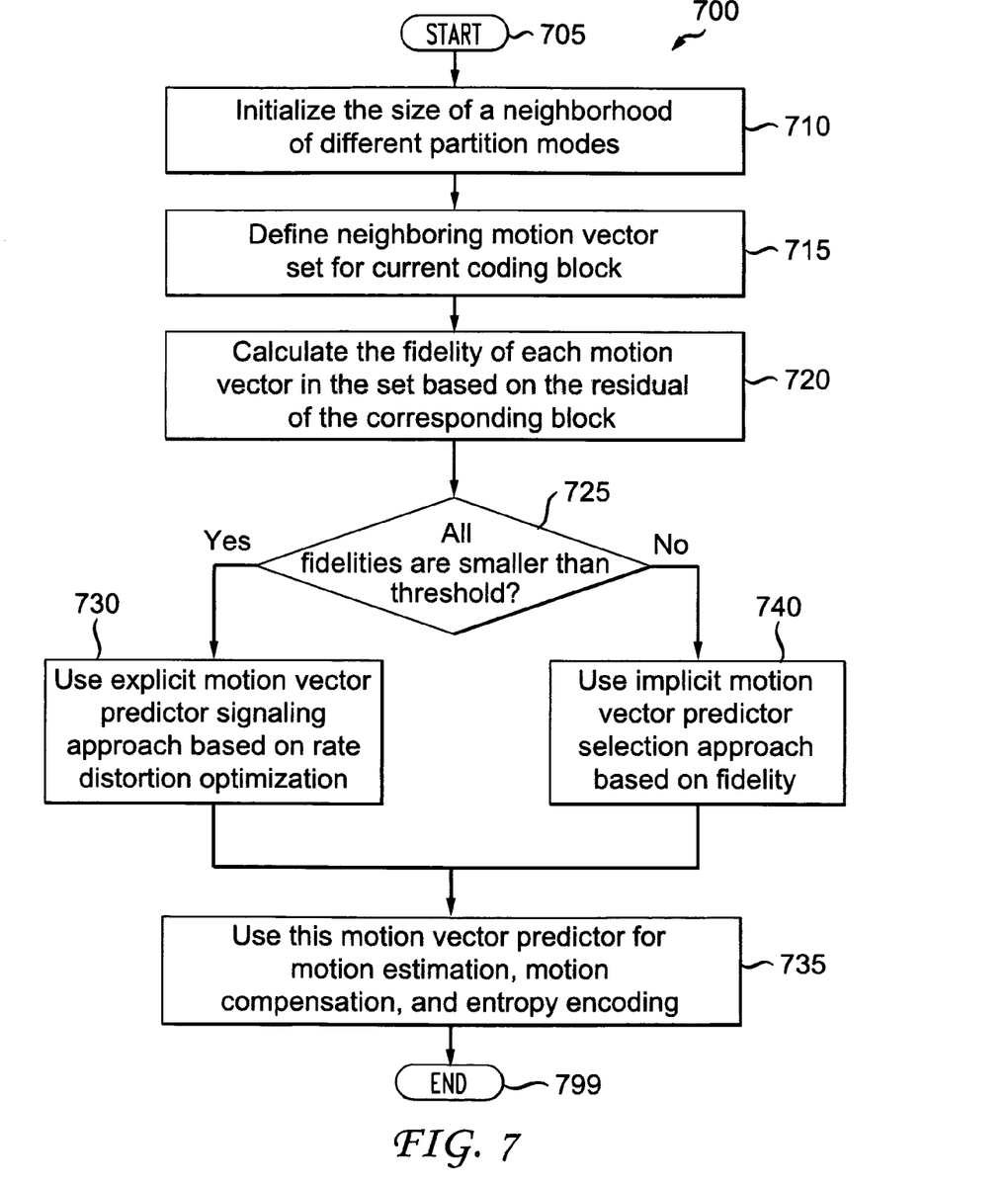
FIG. 7 is a flow diagram showing yet another exemplary method for implicit adaptive motion vector predictor selection in a video encoder, in accordance with an embodiment of the present principles.

Turning to FIG. 7, yet another exemplary method for implicit adaptive motion vector predictor selection in a video encoder is indicated generally by the reference numeral 700. The method 700 includes a start block 705 that passes control to a function block 710. The function block 710 initializes the size of a neighborhood of different partition modes, and passes control to a function block 715. The function block 715 defines the neighboring motion vector set for the current coding block, and passes control to a function block 720. The function block 720 calculates the fidelity of each motion vector in the set based on the residual of the corresponding block, and passes control to a decision block 725. The decision block 725 determines whether or not all fidelities are smaller than a threshold. If so, then control is passed to a function block 730. Otherwise, control is passed to a function block 740. The function block 730 uses the explicit motion vector predictor signaling approach based on rate distortion optimization, and passes control to a function block 735. The function block 740 uses the implicit motion vector predictor selection approach based on fidelity, and passes control to the function block 735. The function block 735 uses this motion vector predictor for motion estimation, motion compensation, and entropy encoding, and passes control to an end block 799.

Figure 8:
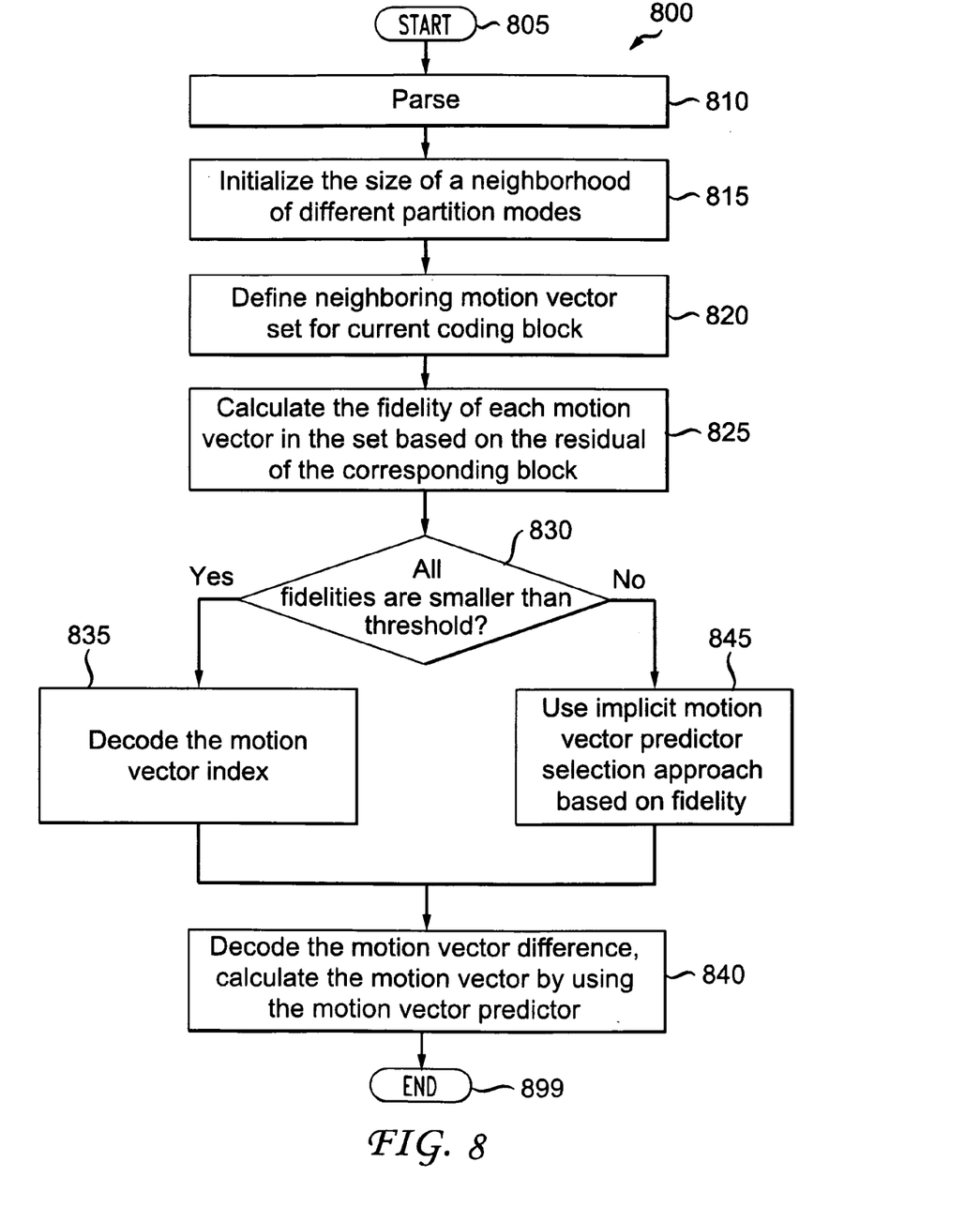
FIG. 8 is a flow diagram showing yet another exemplary method for implicit adaptive motion vector predictor selection in a video decoder, in accordance with an embodiment of the present principles.

Turning to FIG. 8, yet another exemplary method for implicit adaptive motion vector predictor selection in a video decoder is indicated generally by the reference numeral 800. The method 800 includes a start block 805 that passes control to a function block 810. The function block 810 parses an input bitstream, and passes control to a function block 815. The function block 815 initializes the size of a neighborhood of different partition modes, and passes control to a function block 820. The function block 820 defines the neighboring motion vector set for the current coding block, and passes control to a function block 825. The function block 825 calculates the fidelity of each motion vector in the set based on the residual of the corresponding block, and passes control to a decision block 830. The decision block 830 determines whether or not all fidelities are smaller than a threshold. If so, then control is passed to a function block 835. Otherwise, control is passed to a function block 840. The function block 835 decodes the motion vector index, and passes control to a function block 840. The function block 845 uses the implicit motion vector predictor selection approach based on fidelity, and passes control to the function block 840. The function block 840 decodes the motion vector difference, calculates the motion vector by using the motion vector predictor, and passes control to an end block 899.

Syntax

TABLE 1 shows exemplary slice header syntax, in accordance with an embodiment of the present principles.

TABLE 1

| slice_header( ) { | Descriptor |
|---|---|
| ... | |
| use_implicit_mvp_signaling | u(1) |
| ... | |
| } | |
| macroblock( ){ | |
| if ( use_implicit_mvp_signaling ){ | |
| ... | |

TABLE 1-continued

| slice_header( ) { | Descriptor |
|---|---|
|     if ( all fidelities < threshold ){ | |
|         mvp_index | u(v) |
|     } | |
|     ... | |
| } | |
| ... | |
| } | |

The semantics of the syntax elements of TABLE 1 are as follows:

use_implicit_mvp_signaling specifies whether the implicit motion vector predictor selection is used or not. use_implicit_mvp_signaling equal to 1 means the implicit motion vector prediction selection is used; use_implicit_mvp_signaling equal to 0 means it is not used.

mvp_index specifies the index of the motion vector that is selected as motion vector predictor in the candidate set.

A description will now be given of some of the many attendant advantages/features of the present invention, some of which have been mentioned above. For example, one advantage/feature is an apparatus having a video encoder for encoding at least a block in a picture using implicit adaptive motion vector predictor selection, wherein a motion vector for encoding the block is predicted by defining a set of motion vector predictor candidates for the block based on a plurality of spatio-temporal neighboring motion vectors, and selecting from the set a particular motion vector predictor candidate as the motion vector for encoding the block responsive to respective values for a fidelity of the spatio-temporal neighboring motion vectors.

Another advantage/feature is the apparatus having the video encoder as described above, wherein the fidelity is a function of at least one of the motion compensation error, a motion vector magnitude, a reference index, and other motion related information which is available at both the encoder and the corresponding decoder.

Yet another advantage/feature is the apparatus having the video encoder as described above, wherein the particular motion vector predictor candidate selected as the motion vector for encoding the block has a highest fidelity from the motion vector predictor candidates in the set.

Still another advantage/feature is the apparatus having the video encoder as described above, wherein the respective values for the fidelity of the spatio-temporal neighboring motion vectors are used for a weighted median filter to derive the particular motion vector predictor candidate selected as the motion vector for encoding the block.

Moreover, another advantage/feature is the apparatus having the video encoder as described above, wherein the implicit adaptive motion vector predictor selection is combined with explicit signaling of motion vector predictors in a hybrid scenario.

Further, another advantage/feature is the apparatus having the video encoder wherein the implicit adaptive motion vector predictor selection is combined with explicit signaling of motion vector predictors in a hybrid scenario as described above, wherein a decision of whether to use the implicit adaptive motion vector predictor selection or the explicit signaling of motion vector predictors for the block is determined responsive to an evaluation of fidelity values.

Also, another advantage/feature is the apparatus having the video encoder wherein the implicit adaptive motion vector predictor selection is combined with explicit signaling of motion vector predictors in a hybrid scenario as described above, wherein the explicit signaling of motion vector predictors is used at a slice level, and the decision of whether to use the implicit adaptive motion vector predictor selection or the explicit signaling of motion vector predictors for the block is made at a block level.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding an image block using implicit adaptive motion vector predictor selection when at least one of spatio-temporal neighboring motion vector predictor candidates has a value that is inversely proportional to the motion compensation error caused by using the motion vector to compensate the corresponding block, and that is greater than or equal to a threshold, wherein a motion vector for encoding the block is predicted by defining a set of motion vector predictor candidates for the block based on a plurality of spatio-temporal neighboring motion vectors, and selection of a particular motion vector predictor candidate as the motion vector for encoding the block from the set is based on an estimated motion compensation error, motion vector magnitude, reference index, or other parameter available and related to motion information of the spatio-temporal neighboring motion vectors, and using explicit signaling of a motion vector predictor when none of said motion vector predictor candidates has said value that is greater than or equal to a threshold, wherein the respective values for the spatio-temporal neighboring motion vectors are used for a weighted median filter to derive the particular motion vector predictor candidate selected as the motion vector for encoding the block when implicit adaptive motion vector prediction selection is used, and wherein weights for the weighted median filter are a function of a fidelity value.

2. The apparatus of claim 1, wherein the explicit signaling of motion vector predictors is used at a slice level, and the decision of whether to use the implicit adaptive motion vector predictor selection or the explicit signaling of motion vector predictors for the block is made at a block level.

3. In a video encoder, a method, comprising:
encoding an image block using implicit adaptive motion vector predictor selection when at least one of spatio-temporal neighboring motion vector predictor candidates has a value that is inversely proportional to the motion compensation error caused by using the motion vector to compensate the corresponding block, and that is greater than or equal to a threshold, wherein a motion vector for encoding the block is predicted by defining a set of motion vector predictor candidates for the block based on a plurality of spatio-temporal neighboring motion vectors, and selection of a particular motion vector predictor candidate as the motion vector for encoding the block from the set is based on an estimated motion compensation error, motion vector magnitude, reference index, or other parameter available and related to motion information of the spatio-temporal neighboring motion vectors, and using explicit signaling of a motion vector predictor when none of said motion vector predictor candidates has said value that is greater than or equal to a threshold, wherein the respective values for the spatio-temporal neighboring motion vectors are used for a weighted median filter to derive the particular motion vector predictor candidate selected as the motion vector for encoding the block when implicit adaptive motion vector prediction selection is used, and wherein weights for the weighted median filter are a function of a fidelity value.

4. The method of claim 3, wherein the explicit signaling of motion vector predictors is used at a slice level, and the decision of whether to use the implicit adaptive motion vector predictor selection or the explicit signaling of motion vector predictors for the block is made at a block level.

5. An apparatus, comprising:
a video decoder for decoding an image block using implicit adaptive motion vector predictor selection when at least one of spatio-temporal neighboring motion vector predictor candidates has a value that is inversely proportional to the motion compensation error caused by using the motion vector to compensate the corresponding block, and that is greater than or equal to a threshold, wherein a motion vector for decoding the block is predicted by defining a set of motion vector predictor candidates for the block based on a plurality of spatio-temporal neighboring motion vectors, and selection of a particular motion vector predictor candidate as the motion vector for decoding the block from the set is based on an estimated motion compensation error, motion vector magnitude, reference index, or other parameter available and related to motion information of the spatio-temporal neighboring motion vectors, and using explicit signaling of a motion vector predictor when none of said motion vector predictor candidates has said value that is greater than or equal to a threshold, wherein the respective values for the spatio-temporal neighboring motion vectors are used for a weighted median filter to derive the particular motion vector predictor candidate selected as the motion vector for encoding the block when implicit adaptive motion vector prediction selection is used, and wherein weights for the weighted median filter are a function of a fidelity value.

6. The apparatus of claim 5, wherein the explicit signaling of motion vector predictors is used at a slice level, and the decision of whether to use the implicit adaptive motion vector predictor selection or the explicit signaling of motion vector predictors for the block is made at a block level.

7. In a video decoder, a method, comprising:
decoding an image block using implicit adaptive motion vector predictor selection when at least one of spatio-temporal neighboring motion vector predictor candidates has a value that is inversely proportional to the motion compensation error caused by using the motion vector to compensate the corresponding block, and that is greater than or equal to a threshold, wherein a motion vector for decoding the block is predicted by defining a set of motion vector predictor candidates for the block based on a plurality of spatio-temporal neighboring motion vectors, and selection of a particular motion vector predictor candidate as the motion vector for decoding the block from the set is based on an estimated motion compensation error, motion vector magnitude, reference index, or other parameter available and related to motion information of the spatio-temporal neighboring motion vectors, and using explicit signaling of a motion vector predictor when none of said motion vector predictor candidates has said value that is greater than or equal to a threshold, wherein the respective values for the spatio-temporal neighboring motion vectors are used for a weighted median filter to derive the particular motion vector predictor candidate selected as the motion vector for encoding the block when implicit adaptive motion vector prediction selection is used, and wherein weights for the weighted median filter are a function of a fidelity value.

8. The method of claim 7, wherein the explicit signaling of motion vector predictors is used at a slice level, and the decision of whether to use the implicit adaptive motion vector predictor selection or the explicit signaling of motion vector predictors for the block is made at a block level.

9. A computer readable non-transitory storage media having instructions that when executed by one or more processors cause the one or more processors to perform operations for
encoding video signal data thereupon, and
compressing data for an image block encoded using implicit adaptive motion vector predictor selection when at least one of spatio-temporal neighboring motion vector predictor candidates has a value that is inversely proportional to the motion compensation error caused by using the motion vector to compensate the corresponding block, and that is greater than or equal to a threshold,
wherein a motion vector for encoding the block is predicted by defining a set of motion vector predictor candidates for the block based on a plurality of spatiotemporal neighboring motion vectors, and selection of a particular motion vector predictor candidate as the motion vector for encoding the block from the set is based on an estimated motion compensation error, motion vector magnitude, reference index, or other parameter available and related to motion information of the spatiotemporal neighboring motion vectors, and using explicit signaling of a motion vector predictor when none of said motion vector predictor candidates has said value that is greater than or equal to a threshold, wherein the respective values for the spatio-temporal neighboring motion vectors are used for a weighted median filter to derive the particular motion vector predictor candidate selected as the motion vector for encoding the block when implicit adaptive motion vector prediction selection is used, and wherein weights for the weighted median filter are a function of a fidelity value.

* * * * *

UNITED STATES PATENT AND TRADEMARK OFFICE
CERTIFICATE OF CORRECTION

PATENT NO. : 9,628,788 B2
APPLICATION NO. : 13/634663
DATED : April 18, 2017
INVENTOR(S) : Yunfei Zheng et al.

It is certified that error appears in the above-identified patent and that said Letters Patent is hereby corrected as shown below:

On the Title Page

Item (65) Prior Publication Data, "US 2013/0208787 A1 Aug. 15, 2013", next line, insert --Related U.S. Application Data Provisional application No. 61/314,506, filed on Mar. 16, 2010--.

In the Claims

At Column 15, Line 7, in Claim 9, delete "spatiotemporal" and insert --spatio-temporal--.

Signed and Sealed this
Seventh Day of November, 2023

Katherine Kelly Vidal
*Director of the United States Patent and Trademark Office*